(12) United States Patent
Kawabata et al.

(10) Patent No.: US 7,627,097 B2
(45) Date of Patent: Dec. 1, 2009

(54) COMMUNICATIONS TERMINAL UNIT AND METHOD FOR CONTROLLING THE SAME

(75) Inventors: Hirotaka Kawabata, Iwatsuki (JP);
Yoshiharu Sagiya, Iwatsuki (JP);
Kazutaka Saitoh, Iwatsuki (JP); Hideki Fujii, Iwatsuki (JP); Yoshihiro Maei, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 483 days.

(21) Appl. No.: 10/370,594

(22) Filed: Feb. 24, 2003

(65) Prior Publication Data
US 2004/0057568 A1    Mar. 25, 2004

(30) Foreign Application Priority Data
Sep. 19, 2002    (JP)    ............................ P2002-273950

(51) Int. Cl.
H04M 11/00    (2006.01)
H04N 1/00    (2006.01)
H04N 1/32    (2006.01)
H04L 12/66    (2006.01)
H04M 7/00    (2006.01)

(52) U.S. Cl. ............. 379/100.12; 358/400; 358/426.02; 358/442; 358/468; 370/352; 379/88.17; 379/220.01

(58) Field of Classification Search ............ 379/220.01, 379/88.17, 88.01, 100.01, 100.12; 370/352; 358/400, 426.01, 426.02, 442, 468
See application file for complete search history.

(56) References Cited

U.S. PATENT DOCUMENTS

| | | | | |
|---|---|---|---|---|
| 5,073,890 A | * | 12/1991 | Danielsen | ................... 370/270 |
| 5,638,428 A | | 6/1997 | Berku et al. | |
| 5,862,202 A | * | 1/1999 | Bashoura et al. | ....... 379/100.14 |
| 6,065,061 A | | 5/2000 | Blahut et al. | |
| 6,088,437 A | * | 7/2000 | Amick | .................. 379/211.02 |
| 6,278,707 B1 | * | 8/2001 | MacMillan et al. | ......... 370/352 |
| 6,385,179 B1 | * | 5/2002 | Malcolm et al. | ............ 370/329 |
| 6,519,247 B1 | | 2/2003 | Yoshida | |
| 6,628,760 B2 | * | 9/2003 | Mirashrafi et al. | ........ 379/88.17 |
| 6,700,674 B1 | | 3/2004 | Otsuka et al. | |
| 6,700,956 B2 | * | 3/2004 | Chang et al. | ............. 379/93.09 |

(Continued)

FOREIGN PATENT DOCUMENTS

JP        A-07-170383        7/1995

(Continued)

Primary Examiner—Harry S Hong
(74) Attorney, Agent, or Firm—Oliff & Berridge, PLC

(57) ABSTRACT

A communication terminal unit has a system control section including a call destination specification information analysis section that analyzes a destination number which is assigned to a communications terminal unit at the other end and input at the time of origination of a call. On the basis of a result of analysis of the destination number performed by the call destination specification information analysis section, a call origination network determination section automatically determines to originate a call over an IP network or over a public network through use of the destination information that has been subjected to analysis and through use of selected network setting information stored in a selected network setting storage section. Selected network setting information required to automatically determine to originate a call over the IP network or over the public network is stored in the call origination network determination section.

18 Claims, 11 Drawing Sheets

U.S. PATENT DOCUMENTS

| | | | |
|---|---|---|---|
| 6,711,241 B1 * | 3/2004 | White et al. | 379/88.17 |
| 6,985,478 B2 * | 1/2006 | Pogossiants et al. | 370/352 |
| 7,092,379 B1 * | 8/2006 | Singh et al. | 370/352 |
| 7,283,270 B2 * | 10/2007 | Boire-Lavigne et al. | 358/1.15 |
| 7,515,583 B2 * | 4/2009 | Kamani et al. | 370/352 |
| 2002/0002623 A1 | 1/2002 | Endo | |
| 2004/0057421 A1 | 3/2004 | Kawabata et al. | |

FOREIGN PATENT DOCUMENTS

| | | |
|---|---|---|
| JP | A-10-191016 | 7/1998 |
| JP | A-10-243019 | 9/1998 |
| JP | A-11-205574 | 7/1999 |
| JP | A-2000-165578 | 6/2000 |
| JP | A-2000-295393 | 10/2000 |
| JP | A-2001-036641 | 2/2001 |
| JP | A-2001-217929 | 8/2001 |
| JP | A-2002-084395 | 3/2002 |
| KR | 2001-0030762 | 4/2001 |
| KR | A-2002-012252 | 2/2002 |
| KR | A-2003-0021593 | 3/2003 |
| WO | WO 99/17475 | 4/1999 |

* cited by examiner

FIG. 4A

| CALL DESTINATION SPECIFICATION INFORMATION | NETWORK OVER WHICH CALL IS TO BE ORIGINATED |
|---|---|
| FIRST THREE DIGITS | |
| 050 | IP NETWORK |

FIG. 4B

| CALL DESTINATION SPECIFICATION INFORMATION | | NETWORK OVER WHICH CALL IS TO BE ORIGINATED |
|---|---|---|
| FIRST THREE DIGITS | AREA CODE | |
| *×× | 323 | IP NETWORK |
| | 345 | PUBLIC NETWORK |
| | 356 | IP NETWORK |
| | ⋮ | ⋮ |

FIG. 4C

| CALL DESTINATION SPECIFICATION INFORMATION | NETWORK OVER WHICH CALL IS TO BE ORIGINATED |
|---|---|
| FIRST THREE DIGITS | |
| *×× | PUBLIC NETWORK |

FIG. 4D

| CALL DESTINATION SPECIFICATION INFORMATION || NETWORK OVER WHICH CALL IS TO BE ORIGINATED |
|---|---|---|
| FIRST THEREE DIGTS | AREA CODE | |
| 0 * * | 011 | PUBLIC NETWORK |
| | 022 | PUBLIC NETWORK |
| | 045 | IP NETWORK |
| | : | : |

FIG. 4E

| CALL DESTINATION SPECIFICATION INFORMATION | NETWORK OVER WHICH CALL IS TO BE ORIGINATED |
|---|---|
| FIRST THEREE DIGTS | |
| 0 * * | IP NETWORK |

FIG. 4F

| CALL DESTINATION SPECIFICATION INFORMATION || NETWORK OVER WHICH CALL IS TO BE ORIGINATED |
|---|---|---|
| INTERNATIONAL COMMUNICATION | AREA CODE | |
| 00×× | 011 | IP NETWORK |
| | 022 | PUBLIC NETWORK |
| | : | : |

FIG. 4G

| CALL DESTINATION SPECIFICATION INFORMATION | NETWORK OVER WHICH CALL IS TO BE ORIGINATED |
|---|---|
| NATION NO. | |
| 1 (AMERICA) | IP NETWORK |
| 7 (RUSSIA) | PUBLIC NETWORK |
| 75 | IP NETWORK |
| 79 | PUBLIC NETWORK |

FIG. 4H

| CALL DESTINATION SPECIFICATION INFORMATION | NETWORK OVER WHICH CALL IS TO BE ORIGINATED |
|---|---|
| FIRST DIGIT | |
| * | INSIDE-LINE NETWORK (PBX) |
| 0 | IP NETWORK, "0" IS DELETED |

COMMUNICATIONS TERMINAL UNIT AND METHOD FOR CONTROLLING THE SAME

The present disclosure relates to the subject matter contained in Japanese Patent Application No. 2002-273950 filed on Sep. 19, 2002, which is incorporated herein by reference in its entirety.

BACKGROUND OF THE INVENTION

1. Field of the Invention

The present invention relates to a communications terminal unit to be connected to an Internet protocol (IP) network and a public switched telephone network, and to a method for controlling the unit. More specifically, the invention relates to a communications terminal unit having the function of automatically determining whether to originate a call over an IP network or over a public switched telephone network in accordance with call destination specification information input at the time of origination of a call, as well as to a method for controlling the unit.

2. Description of the Related Art

For example, some facsimile machines are connected to both an IP network and a public switched telephone network. In the case of a related-art facsimile machine of this type, a user selects "FAX," in which a call is originated over the public switched telephone network, or "iFAX," in which a call is originated over the IP network.

However, in the case of the facsimile machine which originates a call in accordance with the user's selection of a network, an indispensable feature for all users is the ability to ascertain whether or not a call can be originated to a call receiver over the IP network or whether or not origination of a call over the public switched telephone network incurs a low communication cost.

However, in reality, it is extremely difficulty for all users to ascertain whether or not a call can be originated to a call receiver over the IP network or whether or not origination of a call over the public switched telephone network incurs a low communication cost.

For this reason, there may arise, for example, a case where a waste of communication cost occurs when a call is originated over the public switched telephone network in spite of the possibility of originating a call over the IP network.

In contrast, when, in spite of the impossibility of originating a call over the IP network, an attempt is made to originate a call over the IP network, a communication error arises. In this case, origination of a call over the same network is repeated only a predetermined number of times at predetermined re-dialing intervals. In contrast to a case where the party on the other end of the line is busy, communication cannot be established permanently, because a call is originated over a network over which a call essentially cannot be originated.

As mentioned above, in the case of the related-art facsimile machine connected to both the IP network and the public switched telephone network, the user selects one from the IP network and the public switched telephone network, thereby originating a call. However, it is difficult for all users to ascertain whether or not a call can be originated to a call receiver over the IP network or whether or not origination of a call over the public switched telephone network incurs a lower communication cost.

Therefore, for example, an inevitable occurrence is selection of an inappropriate network at the time of origination of a call; namely, an unavoidable outcome is that a call is originated over the public switched telephone network in spite of the possibility of originating a call over the IP network, or an attempt is made to originate a call over the IP network despite the impossibility of doing so. The former case incurs a waste of communication cost, and the latter case induces a communication error, thus resulting in an incommunicable state.

SUMMARY OF THE INVENTION

The invention aims at solving the problems and providing a communications terminal unit which enables origination of a call over an appropriate network without awareness of selection of one from the IP network and the public switched telephone network, thereby avoiding an increase in communication costs and an increase in the number of communication errors, as well as providing a method for controlling the unit.

In order to achieve the above object, according to a first aspect of the invention, there is provided a communications terminal unit to be connected to an IP network and a public switched telephone network, including: a call destination specification information input section for inputting call destination specification information to be used for specifying a called party; a call destination specification information analysis section for analyzing the call destination specification information inputted by the call destination specification information section; a first line connection section for establishing connection with the IP network; a second line connection section for establishing connection with the public switched telephone network; a storage section for storing an information indicating whether to originate a call over the IP network or over the public switched telephone network in accordance with the call destination specification information; and a determination section for automatically determining whether to originate the call over the IP network or over the public switched telephone network by referring to the information stored in the storage section according to the call destination specification information analyzed by the call destination specification information analysis section at a time of origination of the call in response to input of the call destination specification information performed by the call destination specification information input section.

According to a second aspect of the invention, there is provided a communications terminal unit to be connected to an IP network and a private branch exchange, including: a call destination specification information input section for inputting call destination specification information to be used for specifying a called party; a call destination specification information analysis section for analyzing call destination specification information inputted by the call destination specification information input section; a first line connection section for establishing connection with the IP network; a second line connection section establishing connection with the private branch exchange; a storage section for storing information indicating whether to originate a call over the IP network or over the private branch exchange in accordance with the call destination specification information; and a determination section for automatically determining whether to originate the call over the IP network or over the private branch exchange by referring to information stored in the storage section according to the call destination specification information analyzed by the call destination specification information analysis section at the time of origination of a call in response to input of the call destination specification information performed by the call destination specification information input section.

According to a third aspect of the invention, there is provided a method for controlling a communications terminal unit connected to an IP network and a public switched telephone network and includes a call destination specification information input section for inputting call destination specification information to be used for specifying a called party, a call destination specification information analysis section for analyzing call destination specification information inputted by the call destination specification information input section, a first line connection section to be used for establishing connection with the IP network, and a second line connection section to be used for establishing connection with the public switched telephone network, the method including operations for: storing information indicating whether to originate the call over the IP network or over the public switched telephone network in accordance with the call destination specification information; and automatically determining whether to originate the call over the IP network or over the public switched telephone network by referring to the stored information according to the call destination specification information analyzed by the call destination specification information analysis section at the time of origination of the call in response to input of the call destination specification information performed by the call destination specification information input section.

According to a fourth aspect of the invention, there is provided a method for controlling a communications terminal unit connected to an IP network and a private branch exchange and includes a call destination specification information input section for inputting call destination specification information to be used for specifying a called party, a call destination specification information analysis section for analyzing the call destination specification information inputted by the call destination specification information input section, a first line connection section to be used for establishing connection with the IP network, and a second line connection section to be used for establishing connection with the private branch exchange, the method including operations for: storing information indicating whether to originate a call over the IP network or over the private branch exchange in accordance with the call destination specification information; and automatically determining whether to originate the call over the IP network or over the private branch exchange by referring to the information stored in the storage section according to the call destination specification information analyzed by the call destination specification information analysis section at the time of origination of the call in response to input of the call destination specification information performed by the call destination specification information input section.

According to a fifth aspect of the invention, there is provided a communications terminal unit to be connected to an IP network and a public switched telephone network, including: a phone number information input section for inputting phone number information to be used for specifying a called party; a first line connection section for establishing connection with the IP network; a second line connection section for establishing connection with the public switched telephone network; and a call origination control section for originating the call over the IP network if first three digits of the phone number information assumes 050 at the time of origination of the call in response to input of the phone number information performed by the phone number information input section.

According to a sixth aspect of the invention, there is provided a method for controlling a communications terminal unit connected to an IP network and a public switched telephone network and includes a phone number information input section for inputting phone number information to be used for specifying a called party, a first line connection section for establishing connection with the IP network, and a second line connection section for establishing connection with the public switched telephone network, the method including operations for: originating the call over the IP network if first three digits of the phone number information assumes 050 at the time of origination of the call in response to input of the phone number information performed by the phone number information input section.

BRIEF DESCRIPTION OF THE DRAWINGS

The above objects and advantages of the present invention will become more apparent by describing in detail preferred exemplary embodiments thereof with reference to the accompanying drawings, wherein:

FIGS. 4A to 4H are views showing an example of setting of selected network setting information in a selected network setting information storage section;

DETAILED DESCRIPTION OF THE PREFERRED EMBODIMENTS

Referring now to the accompanying drawings, there are shown preferred embodiments of the invention.

Figure 1:
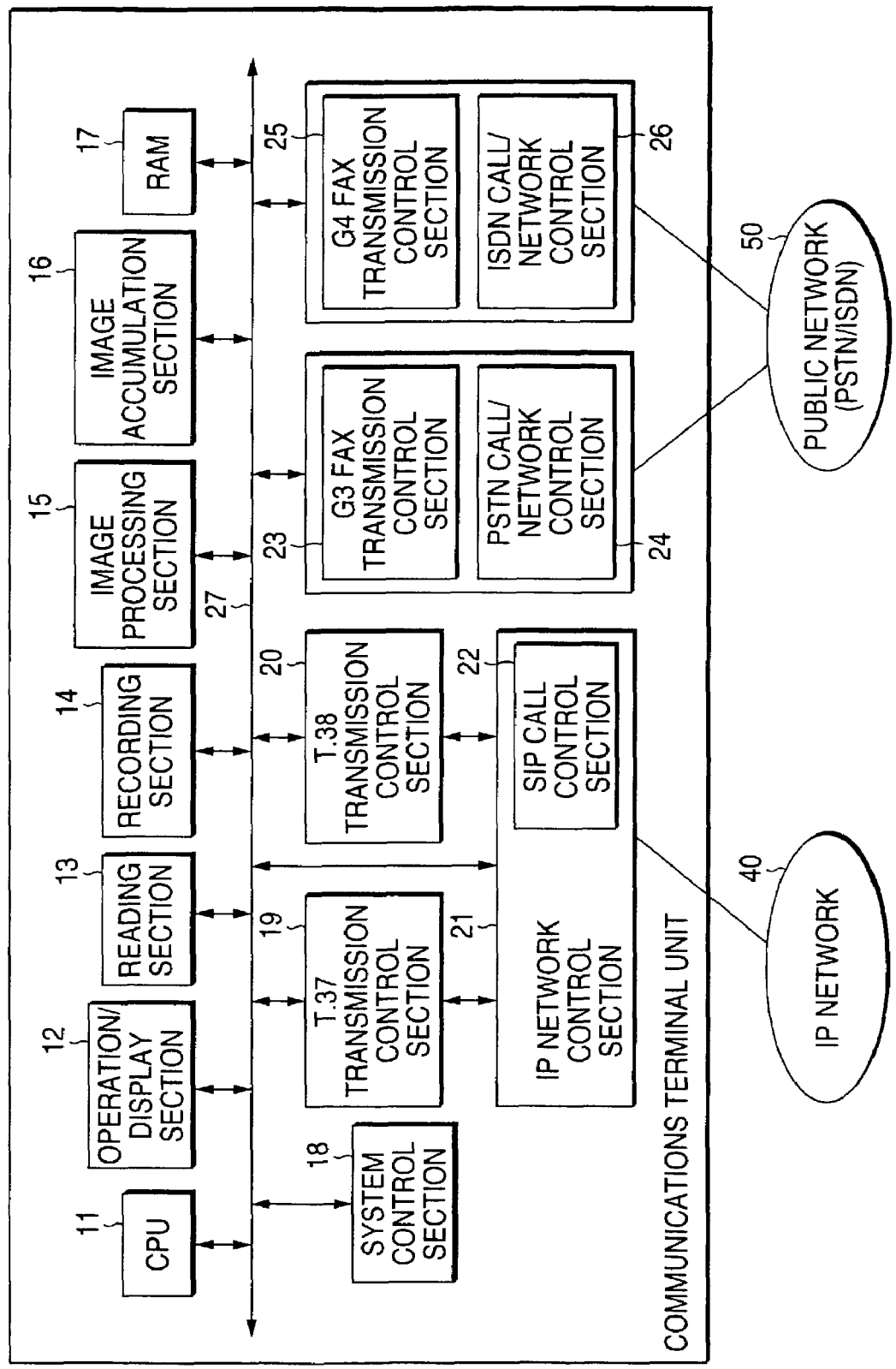
FIG. 1 is a block diagram showing the system configuration of a communications terminal unit according to the invention.

FIG. 1 is a block diagram showing the system configuration of a communications terminal unit according to the invention.

A communication terminal unit 10 includes a central processing unit (CPU) 11 for controlling the entire unit; an operation/display section 12 which is constituted of a touch panel or the like, by way of which a user performs various operations (a call originating operation or the like) for activating the unit, and which displays various information items; a reading section 13 for reading an original to be transmitted or copied; a recording section 14 for recording and outputting received image data or read image data on recording paper; an image processing section 15 for subjecting the image data to processing, such as encoding, decoding, enlargement, and reduction; an image accumulation section 16 for storing received image data or read image data; RAM 17 serving as a work area to be used by a control program (system data for controlling operation of the unit and various information items are stored in the work area); a system control section 18 having a program (ROM) for controlling the entire facsimile machine; a T.37 transmission control section 19 for controlling a Store-and-Forward communications protocol in compliance with ITU-T Recommendation T.37 procedures; a T.38 transmission control section 20 for controlling a real-time communications protocol in compliance with ITU-T Recommendation T.38 procedures; an IP network control section 21 which is connected to an Internet protocol (IP) network 40 and performs communication control operation for exchanging various types of data by initiating communication with the Internet; an SIP call control section 22 which is provided in the IP network control section 21 and controls establishment, maintenance, and completion of a call with a real-time internet FAX T38 through use of procedures defined by RFC3261 (SIP: Session Initiation Protocol) of IETF (Internet Engineer Task Force) and those defined by RFC2327 (SDP: Session Description Protocol); a G3 FAX transmission control section 23 for controlling a facsimile protocol in compliance with the ITU-T recommendation T.30 procedures; a PSTN call/network control section 24 for controlling establishment of a call over an analog public switched telephone network and connection to a network under transmission control of the G3 FAX transmission control section 23; a G4 FAX transmission control section 25 for controlling a G4 facsimile protocol; an ISDN call/network control section 26 for controlling establishment of a call over a digital public switched telephone network and connection to a network under transmission control of the G4 FAX transmission control section 25; and a system bus 27 by way of which data are exchanged among the individual sections of the unit.

The communications terminal unit 10 is connected to the IP network 40 by means of the IP network control section 21 and can communicate with another communications terminal unit at the other end of the line by way of the IP network 40. Further, the communications terminal unit 10 is connected to a public switched telephone network (hereinafter abbreviated as a "public network") 50 by means of the PSTN call/network control section 24 or the ISDN call/network control section 26 and can communicate with another communications terminal unit by way of the public network 50 (e.g., the PSTN or ISDN).

In the present embodiment, the IP network control section 21 functions as a first line connection section for establishing connection with the IP network, and the G3 FAX transmission control section 23, the PSTN call/network control section 24, the G4 FAX transmission control section 25 and the ISDN call/network control section 26 functions as a second line connection section for establishing connection with the public switched telephone network.

Figure 2:
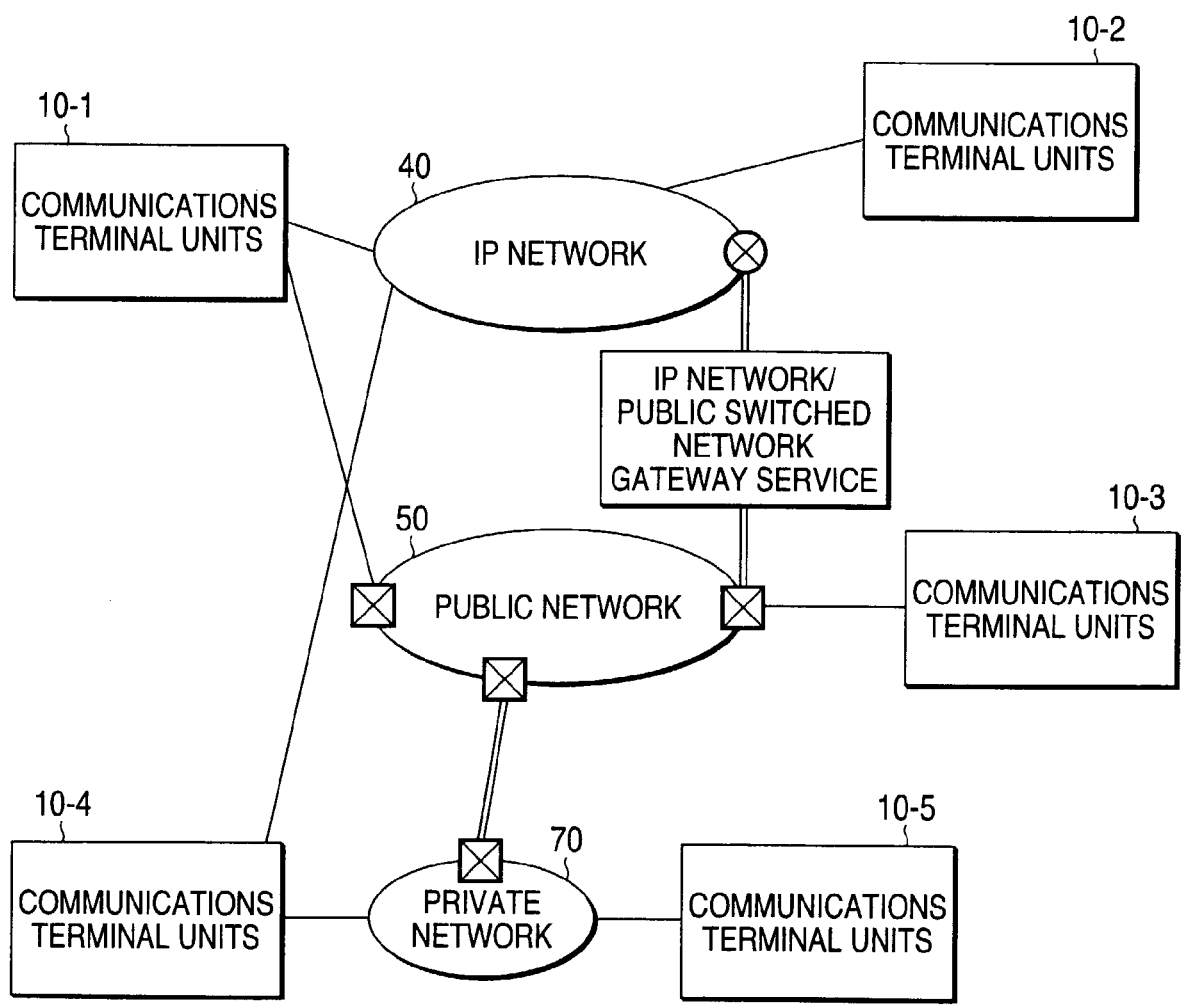
FIG. 2 is a configuration diagram of a network to which the communications terminal unit of the invention is connected.

FIG. 2 is a configuration diagram of a network to which the communications terminal unit 10 of the invention is connected.

As shown in FIG. 2, communications terminal units 10-1, 10-2, 10-3, 10-4, and 10-5 each employ the communications terminal unit 10 shown in FIG. 1.

Here, the communications terminal unit 10-1 is connected to the IP network 40 and the public network 50, and the communications terminal unit 10-2 is connected solely to the IP network 40.

The communications terminal unit 10-3 is connected solely to the public network 50. Further, the communications terminal unit 10-4 is connected to both the IP network 40 and a private network (PBX) 70. The communications terminal unit 10-5 is connected solely to the private network (PBX) 70.

In such a connection environment, for instance, the communications terminal unit 10-1 can communicate with the communications terminal unit 10-2 by way of the IP network 40 or with the communications terminal unit 10-3 by way of the public network 50.

The communications terminal unit 10-1 can also communicate with the communications terminal unit 10-3 over the IP network 40 and the public network 50 by means of utilizing gateway service provided between the IP network 40 and the public network 50.

Further, the communications terminal unit 10-4 can communicate with the communications terminal unit 10-3 by way of the private network 70 or wit the public network 50 or with the communications terminal unit 10-5 by way of the private network 70, as well as with the communications terminal unit 10-2 by way of the IP network 40.

In such a network environment, for instance, when the communications terminal unit 10-1 attempts to initiate communication with a certain communications terminal unit, it is difficult for all users to ascertain whether or not a call can be originated to the communications terminal unit over the IP network 40 or whether or not a lower communication cost is incurred by originating a call over the public network 50.

In order to lessen such a burden imposed on the users, the communications terminal unit 10 of the invention has a control function of enabling selection of an appropriate network and origination of a call on the basis of an entered phone number of a communications terminal unit at the other end of the line (i.e., call destination specification information), by means of the user merely entering the phone number while performing key operation of the operation/display section 12 and performing a transmission start instruction operation (i.e., pressing of a transmission start button).

In the present embodiment, the operation/display section 12 functions as a call destination specification information input section for inputting call destination specification information to be used for specifying a called party, or as a phone number information input section for inputting phone number information to be used for specifying a called party. However, the function of the operation/display section 12 can be imparted to, e.g., the system control section 18 of the communications terminal unit 10.

Figure 3:
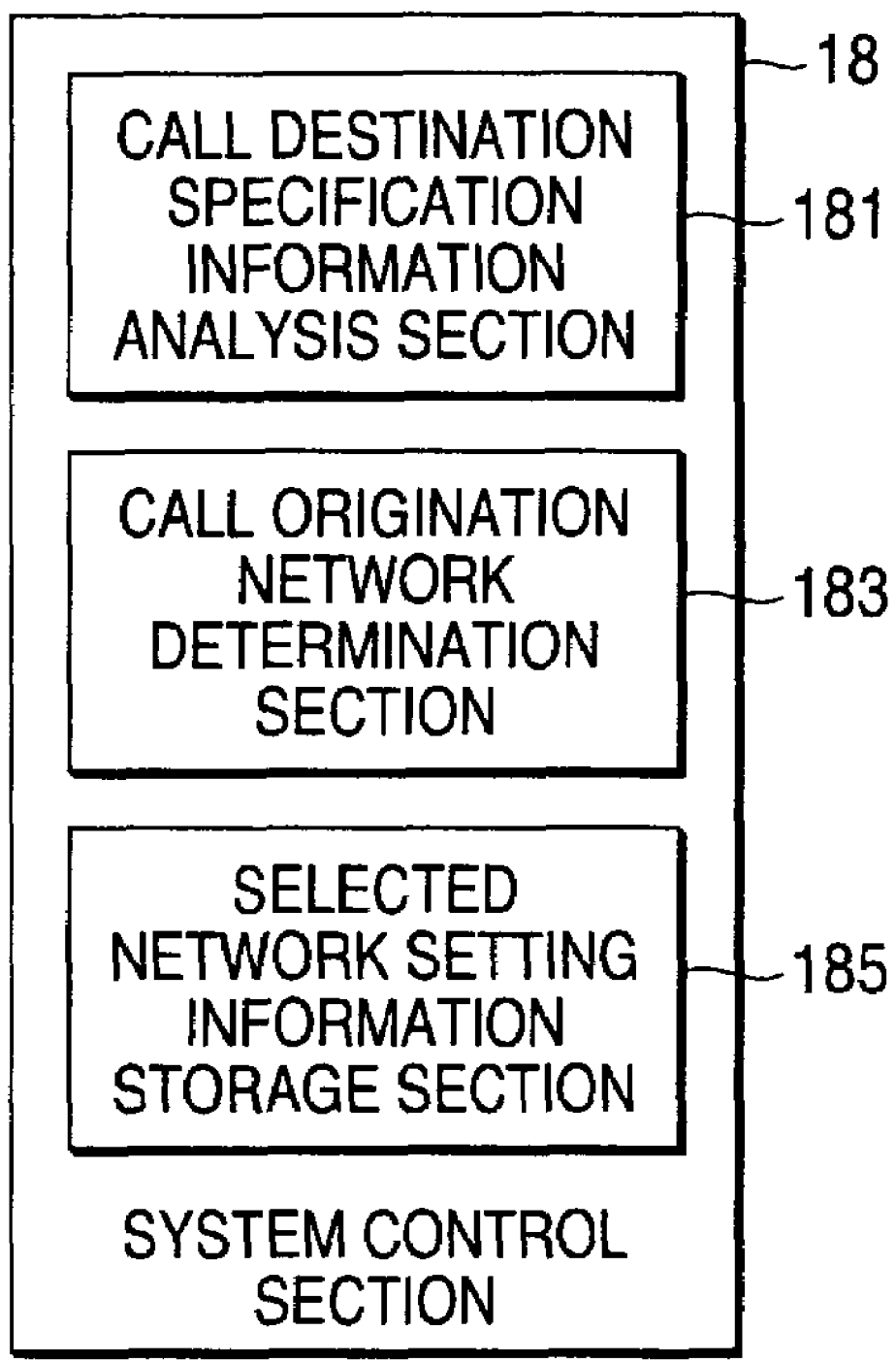
FIG. 3 is a block diagram showing a functional configuration of a system control section of the communications terminal unit of the invention.

FIG. 3 is a block diagram showing the functional configuration of the system control section 18 of the communications terminal unit 10 of the invention.

As shown in FIG. 3, the system control section 18 has a call destination specification information analysis section 181, a call origination network determination section 183, and a selected network setting information storage section 185.

The call destination specification information analysis section 181 analyzes a destination number of the communications terminal unit at the other end entered by way of the operation/display section 12 at the time of origination of a call.

On the basis of a result of analysis of the destination number performed by the call destination specification information analysis section 181, the call origination network determination section 183 automatically determines whether to originate a call over the IP network 40 or the public network 50, by reference to the selected network setting information stored in the selected network setting information storage section 185 and the analyzed destination number.

The selected network setting information storage section 185 stores selected network setting information required for the call origination network determination section 183 to automatically determine whether to originate a call over the IP network 40 or over the public network 50.

In the present embodiment, the call origination network determination section 183 functions as a call destination specification information analysis section for analyzing the call destination specification information inputted by the call destination specification information section.

Also, in the present embodiment, the selected network setting information storage section 185 functions as a storage section for storing an information indicating whether to originate a call over the IP network or over the public switched telephone network in accordance with the call destination specification information.

FIGS. 4A to 4H are views showing an example of setting of selected network setting information to be stored in the selected network setting information storage section 185.

In FIG. 4A, there is stored selected network setting information showing that a call is to be originated over the IP network 40 in response to call destination specification information when the call destination specification information includes specific information indicating that the terminal unit is to be connected to the IP network 40.

Here, the specific information indicating that the terminal unit is to be connected to the IP network 40 corresponds to information, e.g., "050" constituting the first three digits in the call destination specification information.

In FIG. 4B, there is stored selected network setting information showing that a call is to be originated over the IP network 40 or over the public network 50 in response to call destination specification information when the call destination specification information includes local area specification information indicating a local call.

Here, the local area specification information indicating a local call corresponds to information "*XX" constituting the first three digits in the call destination specification information (reference symbol * denotes a numeral other than 0, and X denotes an arbitrary number).

In FIG. 4C, there is stored selected network setting information showing that a call is to be originated over the public network 50 in response to call destination specification information when the call destination specification information includes local area specification information indicating a local call.

Here, the local area specification information indicating a local call corresponds to information "*XX" constituting the first three digits in the call destination specification information (reference symbol * denotes a numeral other than "0," and X denotes an arbitrary number).

In FIG. 4D, there is stored selected network setting information showing that a call is to be originated over the IP network 40 or over the public network 50 in response to call destination specification information when the call destination specification information includes long distance specification information indicating a long-distance call.

Here, the long distance specification information indicating a local call corresponds to information "0**" constituting the first three digits in the call destination specification information (reference symbol * denotes a numeral other than "0").

In FIG. 4E, there is stored selected network setting information showing that a call is to be originated over the IP network 40 in response to call destination specification information when the call destination specification information includes long distance specification information indicating a long-distance call.

Here, the long distance specification information indicating a local call corresponds to information "0**" constituting the first three digits in the call destination specification information (reference symbol * denotes a numeral other than "0").

In FIG. 4F, there is stored selected network setting information showing that a call is to be originated over the IP network 40 or over the public network 50 in response to call destination specification information when the call destination specification information includes overseas specification information indicating an overseas call.

Here, the overseas specification information indicating an overseas call corresponds to information "00XX" constituting the first four digits in the call destination specification information (reference symbol X denotes an arbitrary number).

In FIG. 4G, there is stored selected network setting information showing that a call is to be originated over the IP network 40 or over the public network 50 in response to nation specification information when the call destination specification information indicates an overseas call and includes the nation specification information. Here, the nation specification information corresponds to a phone number of a country. For instance, '1' as for the United States and '7' as for Russia.

In FIG. 4H, there is stored selected network setting information showing that a call is to be originated over the IP network when the call destination specification information includes extention specification information indicating origination of a call to an outside line via a PBX and showing that, in other cases, a call is to be originated via the private network (PBX) to the extention (internal line) and to be originated as an extension call. Here, the extention specification information corresponds to a prefix number ("0" in this embodiment) to be input when the call originator connects the communications terminal unit to an outside line (i.e., a public network) via the PBX.

The above-described various selected network setting information is stored in advance in the selected network setting information storage section 185 by a machine administrator or a customer engineer.

Next will be described call origination network determination control operation to be performed by the system control section 18 having the configuration shown in FIG. 3 at the time of origination of a call.

Figure 5:
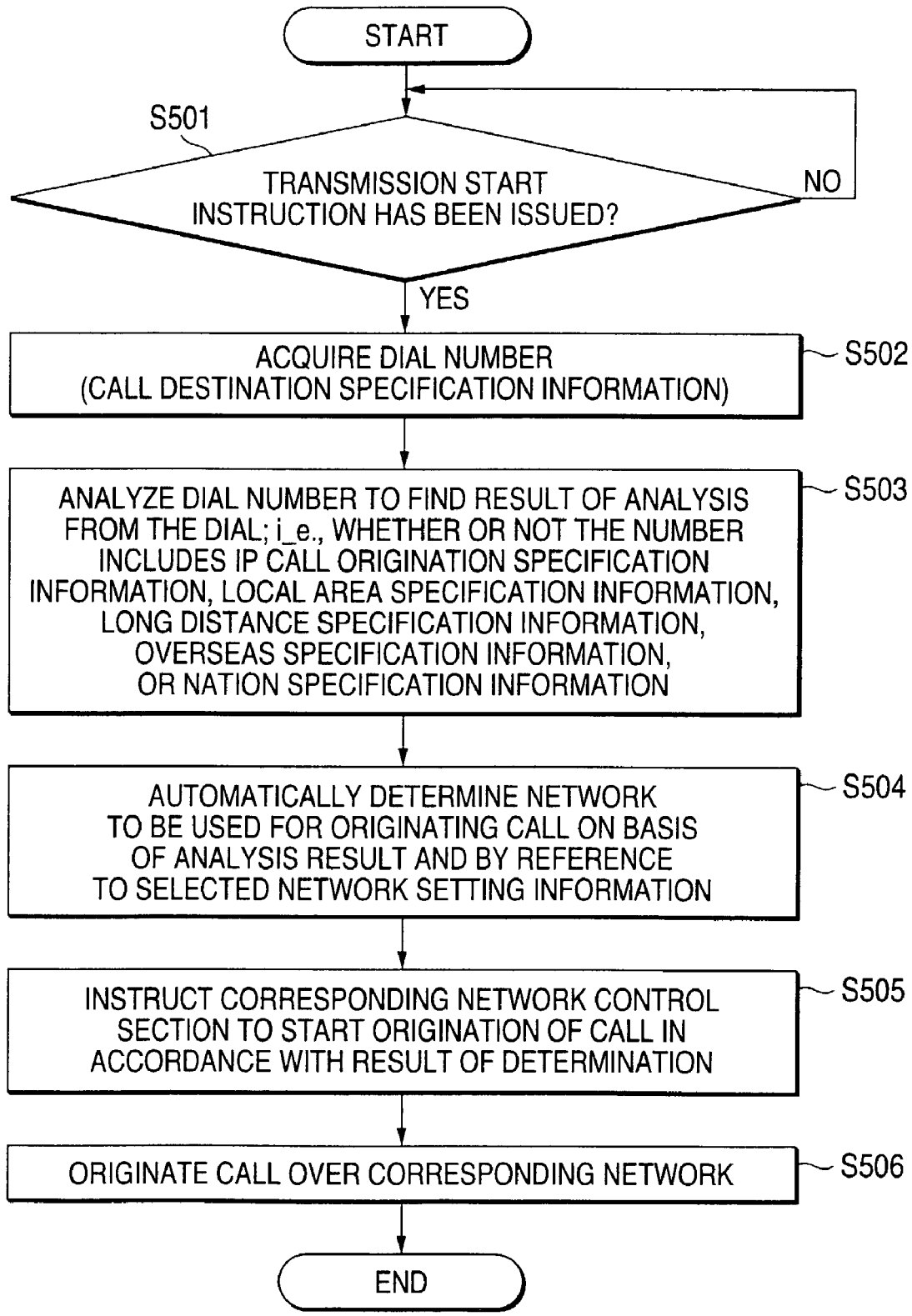
FIG. 5 is a flowchart showing call origination network determination control operation to be performed by the system control section.

FIG. 5 is a flowchart showing call origination network determination control operation to be performed by the system control section 18.

First, in connection with the communications terminal unit 10, the user enters a dial number of a communications terminal unit at the other end, through use of a ten-key numeric pad of the operation/display section 12 (abbreviated dialing may also be employed) as a call origination operation for originating a call to the communications terminal unit. Next, the user presses a start button (transmission start button).

When the communications terminal unit 10 remains in a standby condition, the system control section 18 monitors whether or not a transmission start instruction has been issued by means of the call origination operation being performed by way of the operation/display section 12 (step S501).

Here, when a transmission start instruction has been issued (when YES is selected in step S501), a dial number (call destination specification information) to be input in association with the transmission start instruction is acquired (step S502) and passed to the call destination specification information analysis section 181.

The call destination specification information analysis section 181 analyzes the thus-captured dial number (step S503). Through analyzing operation, a result is determined as to, e.g., whether the input dial number includes specific information indicating origination of a call over the IP network 40, local area specification information indicating a local call, long distance specification information indicating a long distance call, overseas specification information indicating an overseas call, call destination specification information indicating an overseas call and including nation specification information, or extention specification information indicating an extention call.

Next, the call origination network determination section 183 automatically determines whether to originate a call over the IP network 40 or over the public network 50, by reference to the selected network setting information (see FIG. 4) stored in the selected network setting information storage section 185 and on the basis of the result of analysis (step S504).

Here, when the call destination specification information includes specific information showing that the terminal unit is connected to the IP network 40, the call origination determination section 183 determines to originate a call over the IP network 40 in response to the call destination specification information by reference to, e.g., selected network setting information, such as that shown in FIG. 4A.

When the call destination specification information includes local area specification information indicating a local call, the call origination network determination section 183 determines whether to originate a call over the IP network 40 or over the public network 50 in response to the call destination specification information in accordance with, e.g., selected network setting information, such as that shown in FIG. 4B.

When the call destination specification information includes local area specification information indicating a local call, the call origination network determination section 183 determines to originate a call over the public network 50 in response to the call destination specification information in accordance with, e.g., selected network setting information, such as that shown in FIG. 4C.

When the call destination specification information includes long distance specification information indicating a long-distance call, the call origination network determination section 183 determines whether to originate a call over the IP network 40 or over the public network 50 in response to the call destination specification information in accordance with, e.g., selected network setting information, such as that shown in FIG. 4D.

When the call destination specification information includes long distance specification information indicating a long-distance call, the call origination network determination section 183 determines to originate a call over the IP network 40 in response to the call destination specification information in accordance with, e.g., selected network setting information, such as that shown in FIG. 4E.

When the call destination specification information includes overseas specification information indicating an overseas call, the call origination network determination section 183 determines whether to originate a call over the IP network 40 or over the public network 50 in response to the call destination specification information in accordance with, e.g., selected network setting information, such as that shown in FIG. 4F.

When the call destination specification information indicates an overseas call and includes nation specification information, the call origination network determination section 183 determines whether to originate a call over the IP network 40 or over the public network 50 in response to the nation specification information in accordance with, e.g., selected network setting information, such as that shown in FIG. 4G.

When selected network setting information, such as that shown in FIG. 4H, is stored and when the call destination specification information includes specific information indicating origination of a call to an outside line via an extention, the call origination network determination section 183 determines to originate a call over the IP network 40. In other cases, the call origination network determination section 183 determines to originate a call over a PBX provided in a private network.

Subsequently, the system control section 18 instructs a network control section of a corresponding network to originate a call in accordance with a result of determination rendered by the call origination network determination section 183 (step S505), and the network control section that has received the call origination instruction originates a call over the corresponding network (step S506).

Specifically, when origination of a call over the IP network 40 has been determined, the system control section 18 instructs the IP network control section 21 to initiate origination of a call, whereby the IP network control section 21 originates a call over the IP network 40 through use of the SIP call control section 22.

When origination of a call over the public network 50 has been determined, the system control section 18 instructs the PSTN call/network control section 24 or the ISDN call/network control section 26 to originate a call over a network; that is, to the PSTN or to the ISDN in the case of a G3 protocol. In the case of a G4 protocol, the system control section 18 instructs the ISDN call/network control section 26 to initiate origination of a call over the ISDN.

Next, the call origination network determination control operation to be performed by the communications terminal unit 10 of the invention will be sequentially described with reference to specific embodiments.

First Embodiment

In the case of the communications terminal unit 10 of a first embodiment, at least selected network setting information such as that shown in, e.g., FIG. 4A, is stored in the selected network setting information storage section 185.

In the communications terminal unit 10, when the user has entered a dial number assigned to a communications terminal unit at the other end through use of the ten-key pad of the operation/display section 12 (abbreviated dialing may also be employed) and has performed call origination operation, such as pressing of a start button, the first three digits of the dial number entered through the call origination operation are analyzed by the call destination specification information analysis section 181 of the system control section 18.

Here, when the first three digits start with "050," the call origination determination section 183 determines to originate a call over the IP network 40, by reference to the selected network setting information (see FIG. 4A) stored in the selected network setting information storage section 185 and corresponding to the case where the first three digits are "050."

In accordance with this determination, the system control section 18 instructs the IP network control section 21 to start origination of a call and originates a call over the IP network 40 through use of the SIP call control section 22.

Second Embodiment

In the communications terminal unit 10 of a second embodiment, at least selected network setting information, such as that shown in FIG. 4B, is stored in the selected network setting information storage section 185.

In the communications terminal unit 10, the user enters a dial number assigned to a communications terminal unit at the other end, through use of a ten-key pad of the operation/display section 12 (abbreviated dialing may also be employed). Next, when the user has performed call origination operation; that is, pressing of a start button, the call destination specification information analysis section 181 of the system control section 18 analyzes the first three digits of the dial number input by means of the call origination operation.

Here, when the first digit is a number other than "0"; that is, when the first three digits correspond to "*XX" indicating a local call, the call origination network determination section 183 determines whether to originate a call over the IP network 40 or over the public network 50 in response to the "*XX," by reference to the selected network setting information (see FIG. 4B) stored in the selected network setting information storage section 185 and corresponding to the case where the first three digits are "*XX."

By means of the selected network information (see FIG. 4B) set in the embodiment; for example, in the case of "*XX=323," the call origination network determination section 183 determines to originate a call over the IP network 40 in the case where, e.g., "*XX=323" and over the public network 50 in the case where "*XX=345."

When origination of a call over the IP network 40 is determined, the system control section 18 instructs the IP network control section 21 to initiate origination of a call, thereby originating a call over the IP network 40 through use of the SIP call control section 22.

When origination of a call over the public network 50 is determined and the G3 protocol is to be used, the system control section 18 instructs the PSTN call/network control section 24 or the ISDN call/network control section 26 to originate a call over a network such as a PSTN or ISDN. In the case where the G4 protocol is to be used, the system control section 18 instructs the ISDN call/network control section 26 to start originating a call over the ISDN.

Third Embodiment

In the communications terminal unit 10 of a third embodiment, at least selected network setting information, such as that shown in FIG. 4C, is stored in the selected network setting information storage section 185.

In the communications terminal unit 10, the user enters a dial number assigned to a communications terminal unit at the other end, through use of a ten-key pad of the operation/display section 12 (abbreviated dialing may also be employed). Next, when the user has performed call origination operation; that is, pressing of a start button, the call destination specification information analysis section 181 of the system control section 18 analyzes the first three digits of the dial number input by means of the call origination operation.

Here, when the first digit assumes a number other than "0"; that is, when the first three digits correspond to "*XX" indicating a local call, the call origination network determination section 183 determines whether to originate a call over the IP network 40 or over the public network 50 in response to the "*XX," by reference to the selected network setting information (see FIG. 4C) stored in the selected network setting information storage section 185 and corresponding to the case where the first three digits are "*XX."

When origination of a call over the public network 50 is determined and the G3 protocol is to be used, the system control section 18 instructs the PSTN call/network control section 24 or the ISDN call/network control section 26 to originate a call over a network such as a PSTN or ISDN. In the case where the G4 protocol is to be used, the system control section 18 instructs the ISDN call/network control section 26 to start originating a call over the ISDN.

Figure 6:
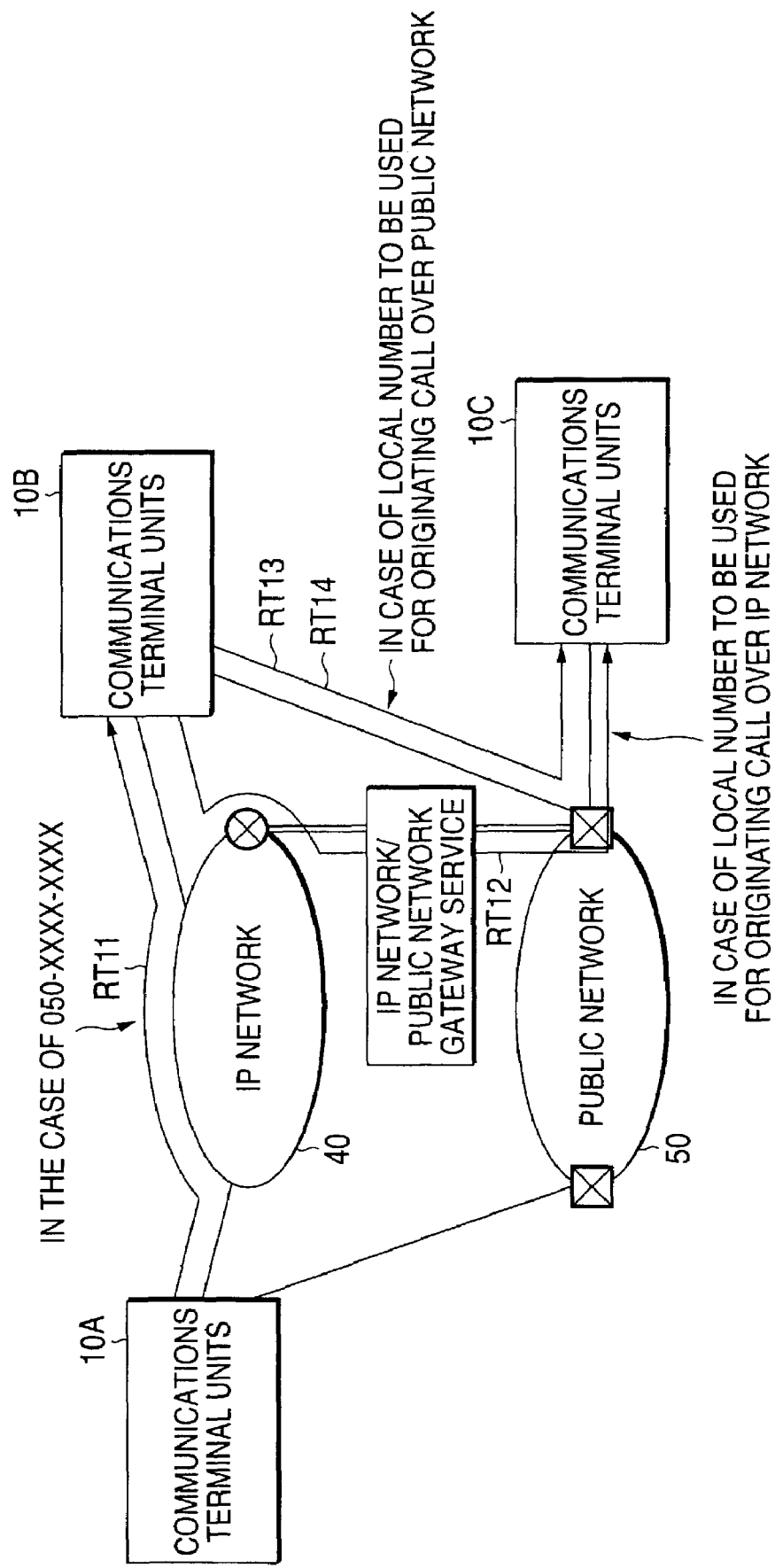
FIG. 6 is a configuration diagram of a network to which communications terminal units of first through third embodiments are connected.

FIG. 6 is a block diagram of a network to which the communications terminal units 10 of the first through third embodiments are connected.

As shown in FIG. 6, communications terminal units 10A and 10B are each connected to the IP network 40 and the public network 50. A communications terminal unit 10C is connected solely to the public network 50. IP network/public network gateway service is provided between the IP network 40 and the public network 50.

In relation to this network configuration, in a case where the communications terminal unit 10A corresponds to the communications terminal unit 10 of the first embodiment, when a dial number whose first three digits assume "050" (050-XXXX-XXXX) is input by means of call origination operation, a call is originated over the IP network 40. As a result, a communications route RT11 is established between a call originator (i.e., the communications terminal unit 10A) and the communications terminal unit 10B on the other end by way of the IP network 40.

In this case, the call originator controls connection through use of a SIP signal; a net printer is employed as a connection port; and T.38 is used as a protocol. The communication route RT11 is routed through only the IP network 40. For instance, in the case of full-time connection, a fixed charge is billed. An additional charge to be billed on a per-communication basis is not required (i.e., no communication fee is charged).

As shown in FIG. 6, when the communications terminal unit 10B corresponds to the communications terminal unit of the second embodiment, a dial number whose first three digits are "*XX" is input through call origination operation. At this time, when a call is originated to the IP network 40 in response to the "*XX" (i.e., in the case of an area code to be dialed over the IP network), a communication route RT12 is established between the call originator (i.e., the communications terminal unit 10B) and the communications terminal unit 10C at the other end while being routed through the IP network 40, the public-network gateway service, and the public network 50.

Also in this case, the call originator controls connection through use of a SIP signal; a net printer is employed as a connection port; and T.38 is used as a protocol. The communication route RT12 is routed from the IP network 40 to the public network 50. A communication fee consists of a fee for a local call plus an additional fee.

As shown in FIG. 6, when the communications terminal unit 10B corresponds to the communications terminal unit 10 of the second embodiment, a dial number whose first three digits are "*XX" is input through call origination operation. At this time, when a call is originated over the public network 50 in response to the "*XX" (i.e., in the case of an area code to be dialed over the public network), a communication route RT13 is established between the call originator (i.e., the communications terminal unit 10B) and the communications terminal unit 1C at the other end while being routed through the public network 50.

As shown in FIG. 6, when the communications terminal unit 10B corresponds to the communications terminal unit 10 of the third embodiment, a dial number whose first three digits are "*XX" is input through call origination operation. At this time, when a call is originated over the public network 50 (i.e., in the case of an area code to be dialed over the public network), a communication route RT14 is established between the call originator (i.e., the communications terminal unit 10B) and the communications terminal unit 10C at the other end while being routed through the public network 50.

In this case (in the case of an area code to be dialed over the public network by utilization of the communication routes RT13 and 14), the call originator controls connection through use of a dial signal; a telephone line is employed as a connection port; and T.30 is used as a protocol (the G4 protocol can also be employed). The communication routes RT13 and 14 are routed through only the public network 50. A communication fee consists of only the fee for a local call.

Here, there may be a case where a contract for a local call can be arranged as a fixed charge. In this case, a call fee can become cheaper than that which would be charged for a call to be originated by way of the IP network/public network gateway service. Accordingly, a machine administrator or a customer engineer must carefully examine a communication fee to be incurred by the communication route RT13 and that to be incurred by the communication route RT12 and set the fees beforehand.

Fourth Embodiment

In the communications terminal unit 10 of a fourth embodiment, at least selected network setting information, such as that shown in FIG. 4D, is stored in the selected network setting information storage section 185.

In the communications terminal unit 10, the user enters a dial number assigned to a communications terminal unit at the other end, through use of a ten-key pad of the operation/display section 12 (abbreviated dialing may also be employed). Next, when the user has performed call origination operation; that is, pressing of a start button, the call destination specification information analysis section 181 of the system control section 18 analyzes the first three digits of the dial number input by means of the call origination operation.

Here, when the first digit is "0" and the second and third digits assume numbers other than "0"; that is, when the first three digits correspond to "0" indicating a long-distance call, the call origination network determination section 183 determines whether to originate a call over the IP network 40 or over the public network 50 in response to the "0," by reference to the selected network setting information [see FIG. 4D] stored in the selected network setting information storage section 185 and corresponding to the case where the first three digits are "0**."

According to the selected network setting information (see FIG. 4D) set in the embodiment, in the case where, e.g., "0=045," origination of a call over the IP network 40 is determined. In the case where "0=011," origination of a call over the public network 50 is determined.

When origination of a call over the IP network 40 is determined, the system control section 18 instructs the IP network control section 21 to start origination of a call, and the IP network control section 21 originates a call over the IP network 40 through use of the SIP call control section 22.

When origination of a call over the public network 50 is determined and the G3 protocol is to be used, the system control section 18 instructs the PSTN call/network control section 24 or the ISDN call/network control section 26 to originate a call over a network such as a PSTN or ISDN. In the case where the G4 protocol is to be used, the system control section 18 instructs the ISDN call/network control section 26 to start originating a call over the ISDN.

Fifth Embodiment

In the communications terminal unit 10 of a fifth embodiment, at least selected network setting information, such as that shown in FIG. 4E, is stored in the selected network setting information storage section 185.

In the communications terminal unit 10, the user enters a dial number assigned to a communications terminal unit at the other end, through use of a ten-key pad of the operation/display section 12 (abbreviated dialing may also be employed). Next, when the user has performed call origination operation; that is, pressing of a start button, the call destination specification information analysis section 181 of the system control section 18 analyzes the first three digits of the dial number input by means of the call origination operation.

Here, when the first digit is "0" and the second and third digits assume numbers other than "0"; that is, when the first three digits correspond to "0" indicating a long-distance call, the call origination network determination section 183 determines to originate a call over the IP network 40, by reference to the selected network setting information (see FIG. 4E) stored in the selected network setting information storage section 185 and corresponding to the case where the first three digits are "0."

In compliance with the determination, the system control section 18 instructs the IP network control section 21 to initiate origination of a call, and a call is originated over the IP network 40 through use of the SIP call control section 22.

Figure 7:
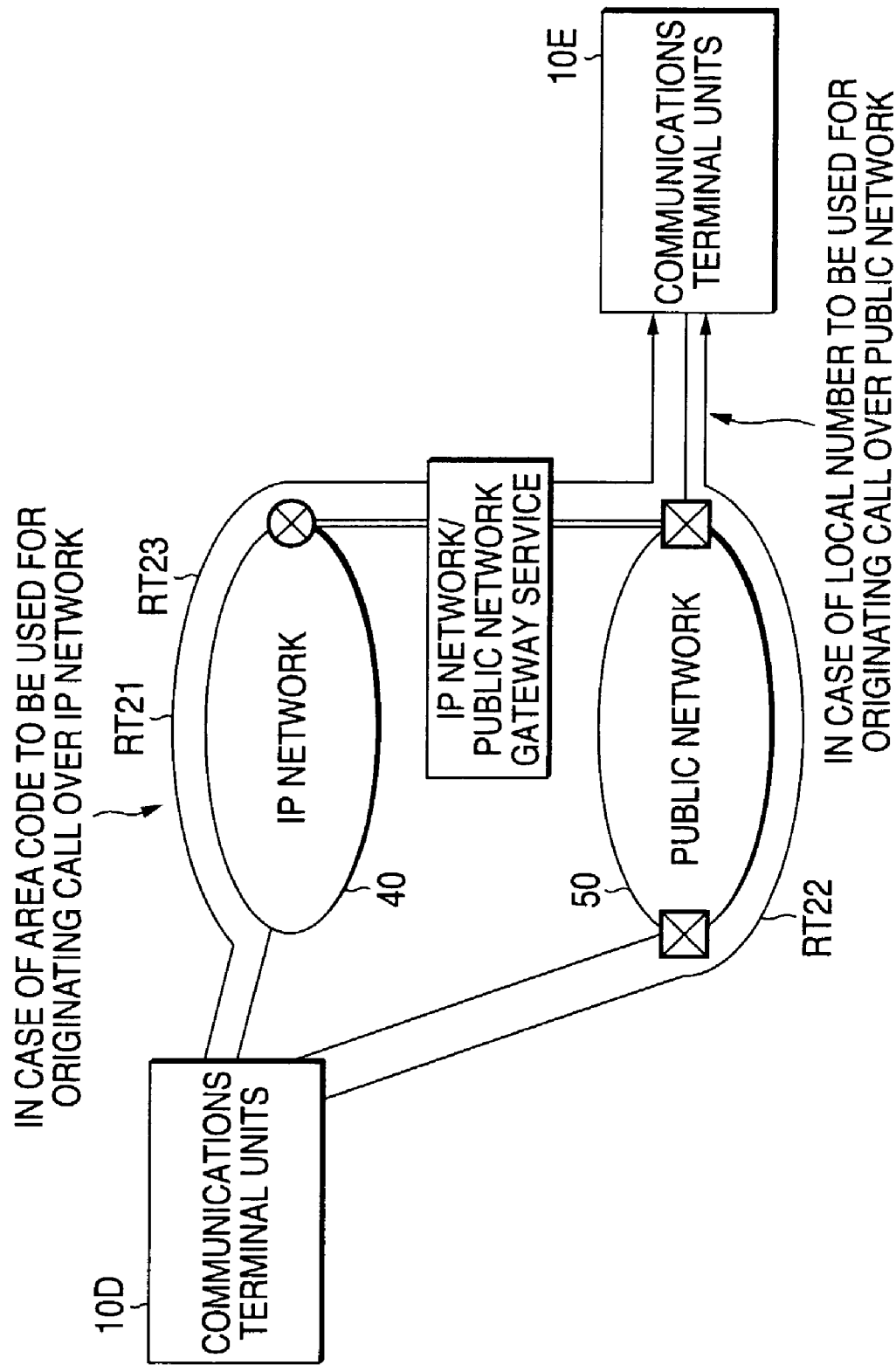
FIG. 7 is a configuration diagram of a network to which communications terminal units of fourth and fifth embodiments are connected.

FIG. 7 is a block diagram of a network to which the communications terminal units 10 of the fourth and fifth embodiments are connected.

As shown in FIG. 7, a communications terminal unit 10D is connected to both the IP network 40 and the public network 50. A communications terminal unit 10E is connected solely to the public network 50. The IP network/public network gateway service is provided between the IP network 40 and the public network 50.

In relation to this network configuration, in a case where the communications terminal unit 10D corresponds to the communications terminal unit 10 of the fourth embodiment, when a dial number whose first three digits are "0" is input by means of call origination operation and a call is originated over the IP network 40 in response to the "0" (i.e., in the case of a long-distance call to be originated over the IP network), a communications route RT21 is established between a call originator (i.e., the communications terminal unit 10D) and the communications terminal unit 10E on the other end by way of the IP network 40, the public-network gateway service, and the public network 50.

In this case, the call originator controls connection through use of a SIP signal; a net printer is employed as a connection port; and T.38 is used as a protocol. The communication route RT21 is routed through the IP network 40 and the public network 50. A communication fee for the IP network 40 is not charged (a fixed fee is charged for full-time connection, and no additional fee is charged on a per-communication basis). Therefore, a total communication fee consists of a fee for a local call plus an additional fee.

As shown in FIG. 7, when the communications terminal unit 10D corresponds to the communications terminal unit 10 of the fourth embodiment, a dial number whose first three digits are "0" is input through call origination operation, and when a call is originated to the public network 50 in response to the "0" (i.e., in the case of an area code to be dialed over the public network), a communication route RT22 is established between the call originator (i.e., the communications terminal unit 10D) and the communications terminal unit 10E at the other end while being routed through the public network 50.

In this case, the call originator controls connection through use of a dial signal; a telephone line is employed as a connection port; and T.30 is used as a protocol (alternatively, the G4 protocol maybe employed as a protocol). The communication route RT22 is routed through only the public network 50. A communication fee consists of a fee for a long-distance call.

As shown in FIG. 7, in a case where the communications terminal unit 10D corresponds to the communications terminal unit of the fifth embodiment, when a dial number whose first three digits are "0" is input through call origination operation and a call is originated over the IP network 40 (in the case of a long-distance call to be dialed over the IP network), a communication route RT23 is established between the call originator (i.e., the communications terminal unit 10D) and the communications terminal unit 10E at the other end while being routed through the IP network 40, the public-network gateway service, and the public network 50**.

In this case, the call originator controls connection through use of a SIP signal; a net printer is employed as a connection port; and T.38 is used as a protocol. The network established by way of the communication route RT23 is embodied by the IP network 40 and the public network 50, as in the case of the communication route RT21. A communication fee consists of a fee for a local call plus an additional fee.

Depending on a contract for a local call, a communication fee may become cheaper than that which would be incurred by a phone call to be originated by way of the IP network/public network gateway. Accordingly, a machine administrator or a customer engineer must carefully examine a communication fee to be incurred by the communication route RT21 and that to be incurred by the communication route RT22 and set the fees beforehand.

Sixth Embodiment

In the communications terminal unit 10 of a sixth embodiment, at least selected network setting information, such as that shown in FIG. 4F, is stored in the selected network setting information storage section 185.

In the communications terminal unit 10, the user enters a dial number assigned to a communications terminal unit at the other end, through use of a ten-key pad of the operation/display section 12 (abbreviated dialing may also be employed). Next, when the user has performed call origination operation; that is, pressing of a start button, the call destination specification information analysis section 181 of the system control section 18 analyzes the dial number input by means of the call origination operation.

Here, when the dial number indicates an overseas call (i.e., international communication) (e.g., when the first four digits assume "00XX"), the call origination network determination section 183 determines whether to originate a call over the IP network 40 or over the public network 50, by reference to the selected network setting information (see FIG. 4F) stored in the selected network setting information storage section 185 and corresponding to the case where the first four digits are "00XX."

According to the selected network setting information set in the embodiment (see FIG. 4F), in the case of, e.g., "00XX=0011," the call origination network determination section 183 determines to originate a call over the IP network 40. In the case where "00XX=0022," the call origination network determination section 183 determines to originate a call over the public network 50.

When origination of a call over the IP network 40 is determined, the system control section 18 instructs the IP network control section 21 to initiate origination of a call, and a call is originated over the IP network 40 through use of the SIP call control section 22.

When origination of a call over the public network 50 is determined and the G3 protocol is to be used, the system control section 18 instructs the PSTN call/network control section 24 or the ISDN call/network control section 26 to originate a call over a network such as a PSTN or ISDN. In the case where the G4 protocol is to be used, the system control section 18 instructs the ISDN call/network control section 26 to start originating a call over the ISDN.

As a modification of the sixth embodiment, the selected network setting information may be set such that all international communication is to be transmitted (originated) over the public network 50.

Seventh Embodiment:

In the communications terminal unit 10 of a seventh embodiment, at least selected network setting information, such as that shown in FIG. 4G, is stored in the selected network setting information storage section 185.

In the communications terminal unit 10, the user enters a dial number assigned to a communications terminal unit at the other end, through use of a ten-key pad of the operation/display section 12 (abbreviated dialing may also be employed). Next, when the user has performed call origination operation; that is, pressing of a start button, the call destination specification information analysis section 181 of the system control section 18 analyzes the dial number input by means of the call origination operation.

Here, when the dial number indicates an overseas call (i.e., international communication) and includes a nation specification number (e.g., number "1" in the case of entry of a dial number 00XX+"1"+123+456+7890), the call origination network determination section 183 determines whether to originate a call over the IP network 40 or over the public network 50 in response to the nation specification number, by reference to the selected network setting information [see FIG. 4G] stored in the selected network setting information storage section 185 while taking the nation specification number as a condition.

According to the selected network setting information set in the embodiment (see FIG. 4G), for example, when the nation specification number assumes "1" (U.S.), the call origination network determination section 183 determines to originate a call over the IP network 40. When the nation specification number assumes "7" (Russia), the call origination network determination section 183 determines to originate a call over the public network 50.

When origination of a call over the IP network 40 is determined, the system control section 18 instructs the IP network control section 21 to initiate origination of a call, and a call is originated over the IP network 40 through use of the SIP call control section 22.

When origination of a call over the public network 50 is determined and the G3 protocol is to be used, the system control section 18 instructs the PSTN call/network control section 24 or the ISDN call/network control section 26 to originate a call over a network such as a PSTN or ISDN. In the case where the G4 protocol is to be used, the system control section 18 instructs the ISDN call/network control section 26 to start originating a call over the ISDN.

As a modification of the seventh embodiment, a list of nation numbers to which a call can be originated from the IP network and a list of nation numbers to which a call is to be originated from a public network may be set in advance as the selected network setting information. By reference to the lists and an input dial number, a determination may be made as to a network over which a call is to be originated. In this case, a machine administrator, a customer engineer, or a like person inputs or sets the lists in the selected network setting information storage section 185.

Figure 8:
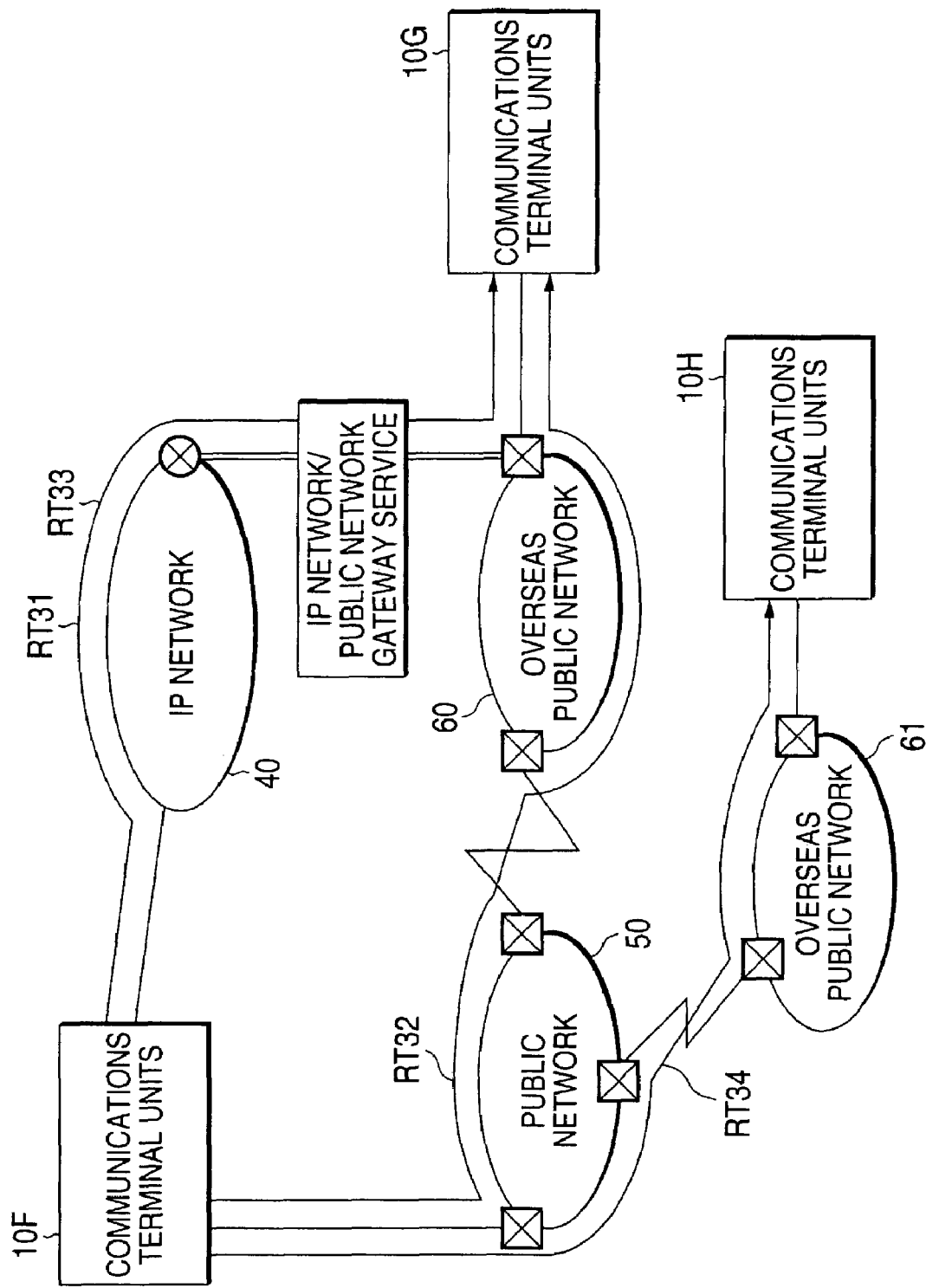
FIG. 8 is a configuration diagram of a network to which communications terminal units of sixth and seventh embodiments are connected.

FIG. 8 is a block diagram of a network to which the communications terminal units 10 of the sixth and seventh embodiments are connected.

As shown in FIG. 8, a communications terminal unit 10F is connected to both the IP network 40 and the public network 50. A communications terminal unit 10G is connected solely to an overseas public network 60, and a communications terminal unit 10H is connected solely to another overseas public network 61.

Locale IP network/public network gateway service are provided between the IP network 40 and the overseas public network 60. The public network 50 is connected to the overseas public networks 60, 61 by means of satellite communication or submarine cables.

In relation to this network configuration, when the communications terminal unit 10F corresponds to the communications terminal unit of the sixth embodiment, a dial number including "00XX" indicating international communication is input through call origination operation, and a call is to be originated over the IP network 40 in response to the "00XX," a communication route RT31 is established between the call originator (i.e., the communications terminal unit 10F) and the communications terminal unit 10G while being routed through the IP network 40, the local IP network, the public-network gateway service, and the overseas public network 60.

As shown in FIG. 8, when the communications terminal unit 10F corresponds to the communications terminal unit of the sixth embodiment, a dial number including "00XX" indicating international communication is input through call origination operation, and a call is to be originated over the public network 50 in response to the "00XX," a communication route RT32 is established between the call originator (i.e., the communications terminal unit 10F) and the communications terminal unit 10G while being routed through the public network 50 and the overseas public network 60.

As mentioned above, in the sixth embodiment the communication route RT31 for transmitting a call from the IP network 40 by way of the local IP network/public network gateway service and the communication route RT32 for transmitting a call from the public network 50 are available.

Accordingly, the sixth embodiment is effective for a case where connection is established to an IP network that does not offer overseas IP phone service.

As shown in FIG. 8, when the communications terminal unit 10F corresponds to the communications terminal unit 10 of the seventh embodiment, a dial number including "00XX" indicating international communication and a nation specification number is input through call origination operation, and a call is to be originated over the IP network 40 in response to the nation specification number, a communication route RT33 is established between the call originator (i.e., the communications terminal unit 10F) and the communications terminal unit 10G while being routed through the IP network 40, the local IP network, the public-network gateway service, and the overseas public network 60.

As shown in FIG. 8, when the communications terminal unit 10F corresponds to the communications terminal unit 10 of the sixth embodiment, a dial number including "00XX" indicating international communication and a nation specification number is input through call origination operation, and a call is to be originated over the public network 50 in response to the nation specification number, a communication route RT34 is established between the call originator (i.e., the communications terminal unit 10F) and a communications terminal unit 10H while being routed through the public network 50 and the overseas public network 61.

As mentioned above, in the seventh embodiment, a call is transmitted from the IP network 40 to a country which offers local gateway service by way of locale IP network/public network gateway service (i.e., the communication route RT33). A call is transmitted to a country which does not offer any local gateway service, by way of the public network 50 (i.e., the communication route RT34).

Accordingly, the seventh embodiment is effective for a case where connection is established to an IP network offered to only countries which provide limited overseas IP phone service.

Eighth Embodiment

An eighth embodiment is premised on use of the communications terminal unit 10 connected to a PBX (private network exchange) which originates a call by adding a prefix number ("0" in this embodiment) to the head of a dial number at the time of origination of a call over a public network.

Specifically, the communications terminal unit is assumed to be used like a communications terminal unit 10I connected to a PBX (not shown) provided in a private network 70 in a network shown in, e.g., FIG. 9 (which will be described in detail later).

In relation to the communications terminal unit 10 of the embodiment assumed to be used in such a manner, a machine administrator or a customer engineer must set connection lines in the PBX and register specific information to be used for originating a call to an outside line by way of the private network 70 (i.e., a prefix number) in advance.

When "0" is registered in the communications terminal unit 10 as a prefix number, the user can originate a call to an outside line by way of the PBX by dialing a phone number of a terminal at the other end of the line while adding "0" to the head of the dial number.

Figure 9:
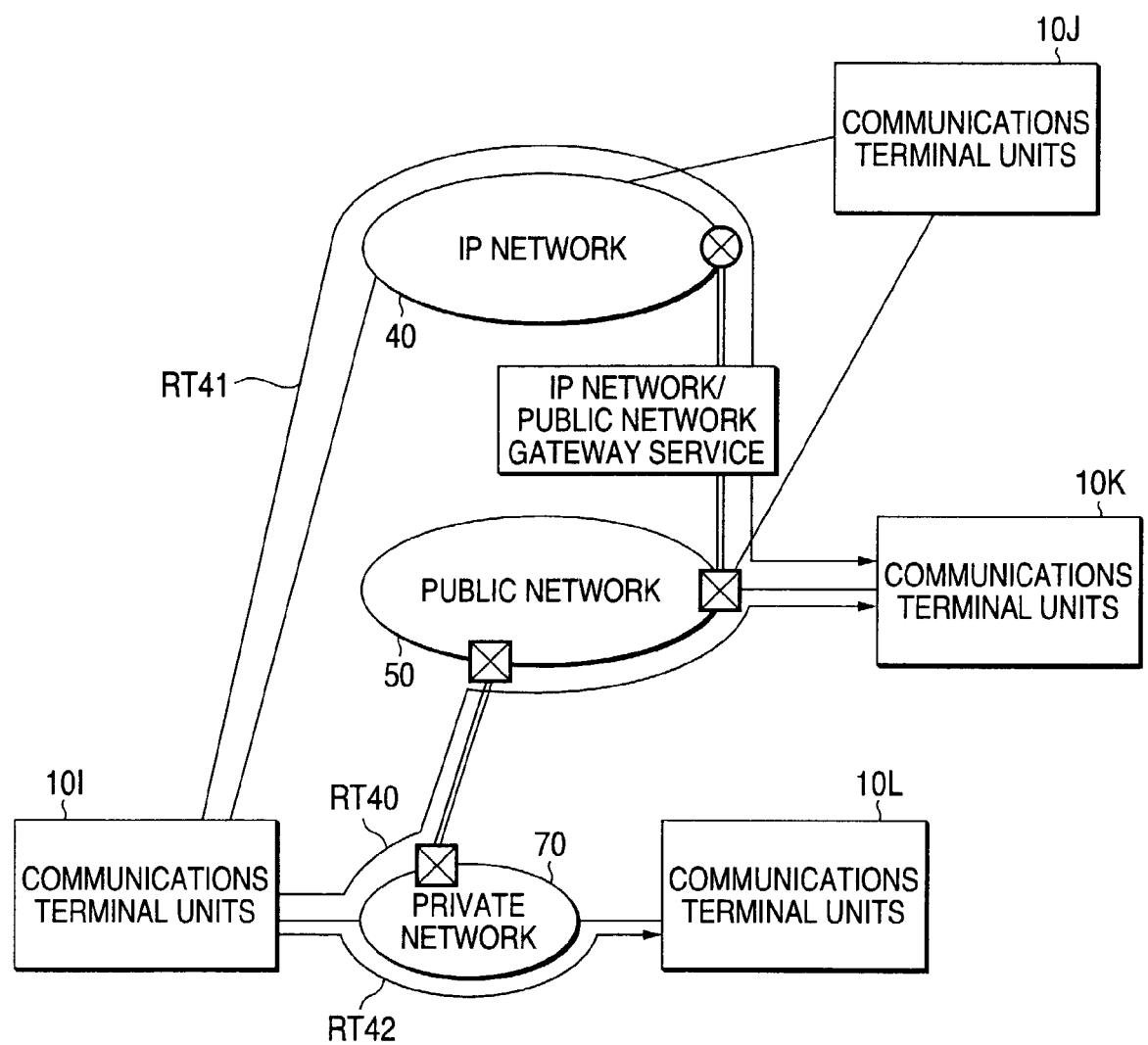
FIG. 9 is a configuration diagram of a network to which a communications terminal unit of an eighth embodiment is connected.

For instance, when a call is originated from the communications terminal unit 10I to the communications terminal unit 10K in the network shown in FIG. 9, connection is established between the private network 70 and the public network 50 by means of a prefix number (which is input when the communications terminal unit 10I has originated a call), thereby establishing a communication route RT40 and effecting communication.

A call can be originated to the private network 70 by dialing only an extension number without addition of "0" to the head of the dial number.

When an attempt is made to originate a call to a communications terminal unit from the IP network 40 on the premise of use of such a network configuration and corresponding call origination conditions, the communications terminal unit 10 of the embodiment has the function of originating a call over the IP network 40 while removing a prefix number to be used for establishing connection to an outside line (i.e., the public network 50) by way of the PBX.

An example of call origination selection control operation of the communications terminal unit 10 of the embodiment will be described hereinbelow.

In the communications terminal unit 10 of the embodiment, at least selected network setting information, such as that shown in FIG. 4H, is stored in the selected network setting information storage section 185.

In the communications terminal unit 10, the user enters a dial number assigned to a communications terminal unit at the other end, through use of the ten-key pad of the operation/display section 12 (abbreviated dialing may also be employed). Next, when the user has performed call origination operation; that is, pressing of a start button, the call destination specification information analysis section 181 of the system control section 18 analyzes the first digit of the dial number input by means of the call origination operation.

Here, when the first digit is "0," the call origination network determination section 183 determines to originate a call over the IP network 40, by reference to the selected network setting information [see FIG. 4H] stored in the selected network setting information storage section 185 and corresponding to the case where the first digit assumes "0."

In compliance with the determination, the system control section 18 instructs the IP network control section 21 to initiate origination of a call, and a call is originated over the IP network 40 through use of the SIP call control section 22. At this time, the system control section 18 determines the first digit "0" provided at the head of the input dial number to be a prefix number to be added at the time of origination of a call over a public network and passes the phone number to the IP network control section 21 by removing the prefix number "0," thereby causing the IP network control section 21 to originate a call over the IP network 40 through use of a remaining dial number.

For example, when a dial number "0-03-3456-1234" is input, a call is originated over the IP network 40 by removing "0" provided at the head of the dial number and through use of the number "03-3456-1234."

If the call destination specification information analysis section 181 determines that the first digit is a numeral other than "0," the call origination network determination section 183 determines that the phone call is originated from an extention and causes a PBX provided in the private network 70 to originate a call, by reference to selected network setting information (see FIG. 4H) stored in the selected network setting information storage section 185 and corresponding to the case where "the first digit at the head assumes a number other than 0."

In accordance with the determination, the system control section 18 instructs the PSTN call/network control section 24 or the ISDN call/network control section 26 to originate a call over the PBX provided in the private network 70.

FIG. 9 is a block diagram showing a network to which the communications terminal units 10 of the eighth embodiment are connected.

As shown in FIG. 9, a communications terminal unit 10I is connected to both the IP network 40 and the private network 70. A communications terminal unit 10J is connected to both the IP network 40 and the public network 50. Further, a communications terminal unit 10K is connected solely to the public network 50, and a communications terminal unit 10I is connected solely to the private network 70.

IP-network-to-public-switched network service is provided between the IP network 40 and the public network 50. The public network 50 and the private network 70 are connected together by means of communications cables.

In such a network configuration, when the communications terminal unit 10I corresponds to the communications terminal unit 10 of the eighth embodiment and when a dial number whose first digit is "0" is input through call origination operation (i.e., when a dial number indicates communication other than communication effected over a private network), a call is originated over the IP network 40 by removing the number provided at the head of the dial number (i.e., "0"=a prefix number). A communication route RT41 is established between the call originator (i.e., the communications terminal unit 10I) and the communications terminal unit 10K at the other end while passing through the IP network 40, the IP network-to-public-switched gateway service, and the public network 50.

As shown in FIG. 9, when the communications terminal unit 10I corresponds to the communications terminal unit 10 of the eighth embodiment and when a dial number whose first digit is other than 0 is input through call origination operation (i.e., when the dial number indicates communication within the private network), a call is originated to the PBX provided in the private network 70. A communication route RT42 is established between the call originator (i.e., the communications terminal unit 10I) and the communications terminal unit 10I by way of the private network 70.

In this way, in a case where a call is intended to be originated within the private network, the communications terminal unit 10 of the eighth embodiment prevents origination of the call by way of the IP network 40 (see the communication route RT42). In a case where a call is other than a call to be originated within the private network, the call is originated from the IP network 40. At this time, a prefix number (i.e., "0" in this embodiment) to be used for establishing connection with the public network 50 from the private network 70 is removed.

By means of such control operation, a call is originated while a prefix to be used for establishing connection with a PBX is automatically removed. Hence, erroneous dialing which would otherwise arise at the time of origination of a call over the IP network 40 can be prevented.

The invention is not limited to the above-illustrated embodiments and is susceptible to modifications falling within the scope of the invention, as required.

For example, in the embodiments a facsimile machine is mentioned as a communications terminal unit. However, the invention can be applied to general phones to be connected to an IP network and a public switched telephone network as well to general communications terminal units having call control procedures using an SIP.

As has been described, according to the invention, a determination as to whether to originate a call over an IP network or over a public switched telephone network in accordance with call destination specification information is stored beforehand. Call destination specification information input at the time of origination of a call is analyzed, and a determination is automatically made as to whether to originate a call over the IP network or over the public switched telephone network by reference to the stored information and through use of a result of analysis. Therefore, all users can select an appropriate network from among the IP network and the public switched telephone network without consciousness of selection of a network suitable for a called party. A call can be originated by selection of an appropriate one from the IP network and the public switched telephone network, thereby avoiding occurrence of an increase in communication cost and occurrence of a communication error, which would otherwise be caused by origination of a call by way of an inappropriate network.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A facsimile machine comprising:

an image reading unit that reads an image printed on a document;

a storage section that stores selected network establishing information which associates at least a part of each call destination specification information that specifies a called party with call network specification information, where the call network specification information is specified by a user beforehand and indicates that a call is to be made over an IP network or over a public switched telephone network when the call destination specification information is input;

a control section;

a first line connection section that establishes connection with the IP network to fax the image read by the image reading unit over the IP network; and a second line connection section that establishes connection with the public switched telephone network to fax the image read by the image reading unit over the public switched telephone network, wherein:

when one call destination specification information is input to the communications terminal unit, the control section selects one of the IP network and the public switched telephone network based on the selected network establishing information stored in the storage section and the one call destination specification information independent of a determination on whether any additional call destination specification information is associated with the one call destination specification, when the selected one is the IP network, the control section controls the first line connection section to make a call to a called party indicated by the one call destination specification information over the IP network, and when the selected one is the public switched telephone network, the control section controls, independent of the first line connection section, the second line connection section to make a call to the called party indicated by the one call destination specification information over the public switched telephone network.

2. The facsimile machine as claimed in claim 1, wherein the call destination specification information is a dial number of a called party.

3. The facsimile machine as claimed in claim 1, wherein the call destination specification information includes at least one of specific information showing that the communications terminal unit is connected to an IP network, local area specification information indicating a local call, long distance specification information indicating a long-distance call, and overseas specification information indicating an overseas call.

4. The facsimile machine as claimed in claim 1,
wherein the call destination specification information includes at least one of specific information showing that the communications terminal unit is connected to an IP network, local area specification information indicating a local call, long distance specification information indicating a long-distance call, and overseas specification information indicating an overseas call; and the storage section stores selected network establishing information which associates at least one of the specific information, the local area specification information, the long distance specification information, and the overseas specification information with the call network specification information.

5. The facsimile machine as claimed in claim 1, further comprising a call destination specification information input section that allows the user to input the call destination specification information.

6. A facsimile machine comprising:

an image reading unit that reads an image printed on a document;

a storage section that stores plural pieces of call destination specification information that specify respective called parties and stores selected network establishing information which associates each call destination specification information with call network specification information, where the call network specification information is specified beforehand and indicates that a call is to be made over an IP network or over a public switched telephone network when the call destination specification information is input;

a control section;

a first line connection section that establishes connection with the IP network to fax the image read by the image reading unit over the IP network; and a second line connection section that establishes connection with the public switched telephone network to fax the image read by the image reading unit over the public switched telephone network, wherein:

when one call destination specification information is input to the communications terminal unit, the control section selects one of the IP network and the public switched telephone network based on the selected network establishing information stored in the storage section and the one call destination specification information independent of a determination on whether any additional call destination specification information is associated with the one call destination specification, when the selected one is the IP network, the control section controls the first line connection section to make a call to a called party indicated by the one call destination specification information over the IP network, and when the selected one is the public switched telephone network, the control section controls, independent of the first line connection section, the second line connection section to make a call to the called party indicated by the one call destination specification information over the public switched telephone network.

7. A facsimile machine comprising:

an image reading unit that reads an image printed on a document;

a storage section that stores selected network establishing information which associates at least a part of each call destination specification information that specifies a called party with call network specification information, where the call network specification information is specified by a user beforehand and indicates that a call is to be made over an IP network or over a private branch exchange when the call destination specification information is input;

a control section;

a first line connection section that establishes connection with the IP network to fax the image read by the image reading unit over the IP network; and a second line connection section that establishes connection with the private branch exchange to fax the image read by the image reading unit over the private branch exchange, wherein:

when one call destination specification information is input to the communications terminal unit, the control section selects one of the IP network and the private branch exchange based on the selected network establishing information stored in the storage section and the one call destination specification information independent of a determination on whether any additional call destination specification information is associated with the one call destination specification, when the selected one is the IP network, the control section controls the first line connection section to make a call to a called party indicated by the one call destination specification information over the IP network, and when the selected one is the private branch exchange, the control section controls, independent of the first line connection section, the second line connection section to make a call to the called party indicated by the one call destination specification information over the private branch exchange.

8. The facsimile machine as claimed in claim 7, further comprising a call destination specification information input section that allows the user to input the call destination specification information.

9. The facsimile machine as claimed in claim 7, wherein the call destination specification information includes specific information indicating origination of the call to an outside line by way of an extension.

10. The facsimile machine as claimed in claim 7, wherein when the call destination specification information includes prefix information for establishing connection with an outside line by way of the private branch exchange, the first line connection section automatically removes the prefix information from the call destination specification information to establish connection with the IP network.

11. A computer readable medium storing a program causing a computer to execute a process for controlling a facsimile machine, the process comprising:

reading an image printed on a document by an image reading unit;

storing selected network establishing information which associates at least a part of each call destination specification information that specifies a called party with network specification information, where the network specification information is specified by a user beforehand and indicates that a call is to be made over an IP network or over a public switched telephone network call when the call destination specification information is input, wherein a first line connection establishes connection with the IP network to fax the image read by the image reading unit over the IP network and a second line connection establishes connection with the public switched telephone network to fax the image read by the image reading unit over the public switched telephone network;

when one call destination specification information is input to the communications terminal unit, selecting one of the IP network and the public switched telephone network based on the selected network establishing information stored in the storage section and the one call destination specification information independent of a determination on whether any additional call destination specification information is associated with the one call destination specification;

when the selected one is the IP network, controlling the first line connection to make a call to a called party indicated by the one call destination specification information over the IP network; and when the selected one is the public switched telephone network, controlling, independent of the first line connection, the second line connection to make a call to the called party indicated by the one call destination specification information over the public switched telephone network.

12. The computer readable medium as claimed in claim 11, wherein the call destination specification information is a dial number of a called party.

13. The computer readable medium as claimed in claim 11, wherein the call destination specification information includes at least one of specific information showing that the communications terminal unit is connected to an IP network, local area specification information indicating a local call, long distance specification information indicating a long-distance call, and overseas specification information indicating an overseas call.

14. The computer readable medium as claimed in claim 11, wherein the call destination specification information includes at least one of specific information showing that the communications terminal unit is connected to an IP network, local area specification information indicating a local call, long distance specification information indicating a long-distance call, and overseas specification information indicating an overseas call; and storing selected network establishing information which associates at least one of the specific information, the local area specification information, the long distance specification information, and the overseas specification information with the call network specification information.

15. The computer readable medium as claimed in claim 11, further comprising inputting, by the user, the call destination specification information.

16. A computer readable medium storing a program causing a computer to execute a process for controlling a facsimile machine, the process comprising:

reading an image printed on a document by an image reading unit;

storing selected network establishing information which associates at least a part of each call destination specification information that specifies a called party with call network specification information, where the call network specification information is specified by a user beforehand and indicates that a call is to be made over an IP network or over a private branch exchange when the call destination specification information is input, wherein a first line connection establishes connection with the IP network to fax the image read by the image reading unit over the IP network and a second line connection establishes connection with the private branch exchange to fax the image read by the image reading unit over the private branch exchange, when one call destination specification information is input to the communications terminal unit, selecting one of the IP network and the private branch exchange based on the selected network establishing information stored in the storage section and the one call destination specification information independent of a determination on whether any additional call destination specification information is associated with the one call destination specification;

when the selected one is the IP network, controlling the first line connection to make a call to a called party indicated by the one call destination specification information over the IP network; and when the selected one is the private branch exchange, controlling, independent of the first line connection, the second line connection to make a call to the called party indicated by the one call destination specification information over the private branch exchange.

17. The computer readable medium of claim 16, the process further comprising:

inputting, by the user, the call destination specification information.

18. The computer readable medium as claimed in claim 16, wherein the call destination specification information includes specific information indicating origination of the call to an outside line by way of an extension.

* * * * *